(12) United States Patent
Andrews et al.

(10) Patent No.: US 10,949,819 B2
(45) Date of Patent: *Mar. 16, 2021

(54) MANAGING DEVICES ASSOCIATED WITH A DIGITAL WALLET ACCOUNT (71) Applicant: Google LLC, Mountain View, CA (US)

(72) Inventors: Mark William Andrews, San Francisco, CA (US); Peter Malcolm Gwinn, San Francisco, CA (US); Erick John Armbrust, San Francisco, CA (US); Petra Cross, Mountain View, CA (US); Christopher Michael Peterson, New Canaan, CA (US)

(73) Assignee: Google LLC, Mountain View, CA (US)

( * ) Notice: Subject to any disclaimer, the term of this patent is extended or adjusted under 35 U.S.C. 154(b) by 272 days.

This patent is subject to a terminal disclaimer.

(21) Appl. No.: 16/166,053

(22) Filed: Oct. 19, 2018

(65) Prior Publication Data
US 2019/0057364 A1    Feb. 21, 2019

Related U.S. Application Data (63) Continuation of application No. 13/731,090, filed on Dec. 30, 2012, now Pat. No. 10,127,533.

(Continued)

(51) Int. Cl.
G06Q 20/00    (2012.01)
G06Q 20/10    (2012.01)
(Continued)

(52) U.S. Cl.
CPC ............ G06Q 20/105 (2013.01); G06K 5/00 (2013.01); G06Q 20/00 (2013.01); G06Q 20/322 (2013.01);
(Continued)

(58) Field of Classification Search
CPC ...... G06Q 20/105; G06Q 20/40; G06Q 20/00; G06Q 20/3572; G06Q 20/382;
(Continued)

(56) References Cited

U.S. PATENT DOCUMENTS 5,221,838 A    6/1993  Gutman et al.
5,590,038 A    12/1996 Pitroda
(Continued)

FOREIGN PATENT DOCUMENTS

CA    2 381 614 A1    3/2001
CN    101878492 A     11/2010
(Continued)

OTHER PUBLICATIONS

Ma "Chinese Notification of Reexamination issued in Chinese Application No. 201380050257.1", dated Sep. 16, 2019, 2 pages of English Translation and 2 pages of Chinese Office Action.
(Continued)

Primary Examiner — Scott S Trotter
(74) Attorney, Agent, or Firm — Dority & Manning, P.A.

(57) ABSTRACT

Managing user devices associated with a digital wallet account comprises associating, using one or more computing devices, one or more user computing devices with a digital wallet account of a user, each of the associated one or more user computing devices being activated to conduct financial transactions with a merchant utilizing the digital wallet account; presenting the associated user computing devices in a list of associated user computing devices; receiving a request to deactivate a particular user computing device from the list of associated user computing devices; deactivating the particular user computing device, the deactivation being sufficient to prevent the user computing device from conducting transactions with a merchant utiliz- (Continued)

ing the digital wallet account; and presenting a deactivated status of the particular user computing device.

20 Claims, 4 Drawing Sheets

Related U.S. Application Data (60) Provisional application No. 61/678,089, filed on Jul. 31, 2012.

(51) Int. Cl.
    *G06Q 20/36*       (2012.01)
    *G06Q 40/00*       (2012.01)
    *G06K 5/00*        (2006.01)
    *G06Q 30/00*       (2012.01)
    *G06Q 20/34*       (2012.01)
    *G06Q 20/32*       (2012.01)
    *G06Q 20/38*       (2012.01)
    *G06Q 20/40*       (2012.01)

(52) U.S. Cl.
    CPC ......... *G06Q 20/351* (2013.01); *G06Q 20/354* (2013.01); *G06Q 20/3572* (2013.01); *G06Q 20/36* (2013.01); *G06Q 20/3674* (2013.01); *G06Q 20/382* (2013.01); *G06Q 20/40* (2013.01); *G06Q 20/405* (2013.01); *G06Q 30/00* (2013.01); *G06Q 40/00* (2013.01)

(58) Field of Classification Search
    CPC .. G06Q 30/00; G06Q 20/3674; G06Q 20/354; G06Q 40/00; G06Q 20/322; G06Q 20/351; G06Q 20/405; G06Q 20/36; G06K 5/00
    See application file for complete search history.

(56) References Cited

U.S. PATENT DOCUMENTS

| | | | |
|---|---|---|---|
| 5,640,002 A | 6/1997 | Ruppert et al. |
| 5,748,740 A | 5/1998 | Curry et al. |
| 5,805,702 A | 9/1998 | Curry et al. |
| 5,883,810 A | 3/1999 | Franklin et al. |
| 5,884,271 A | 3/1999 | Pitroda |
| 5,901,303 A | 5/1999 | Chew |
| 5,940,510 A | 8/1999 | Curry et al. |
| 5,949,880 A | 9/1999 | Curry et al. |
| 6,000,832 A | 12/1999 | Franklin et al. |
| 6,005,942 A | 12/1999 | Chan et al. |
| 6,073,840 A | 6/2000 | Marion |
| 6,105,013 A | 8/2000 | Curry et al. |
| 6,116,505 A | 9/2000 | Withrow |
| 6,131,811 A | 10/2000 | Gangi et al. |
| 6,148,192 A | 11/2000 | Ahvenainen |
| 6,233,683 B1 | 5/2001 | Chan et al. |
| 6,237,095 B1 | 5/2001 | Curry et al. |
| 6,422,464 B1 | 7/2002 | Terranova |
| 6,587,835 B1 | 7/2003 | Treyz et al. |
| 6,601,759 B2 | 8/2003 | Fife et al. |
| 6,671,358 B1 | 12/2003 | Seidman et al. |
| 6,732,081 B2 | 5/2004 | Nicholson |
| 6,769,607 B1 | 8/2004 | Pitroda et al. |
| 6,786,400 B1 | 9/2004 | Bucci |
| 6,813,609 B2 | 11/2004 | Wilson |
| 6,837,436 B2 | 1/2005 | Swartz et al. |
| 6,879,965 B2 | 4/2005 | Fung et al. |
| 6,912,398 B1 | 6/2005 | Domnitz |
| 6,925,439 B1 | 8/2005 | Pitroda |
| 7,083,094 B2 | 8/2006 | Cooper |
| 7,110,792 B2 | 9/2006 | Rosenberg |
| 7,127,236 B2 | 10/2006 | Khan et al. |
| 7,155,405 B2 | 12/2006 | Petrovich |
| 7,194,422 B1 | 3/2007 | St. John Killick |
| 7,216,109 B1 | 5/2007 | Donner |
| 7,249,112 B2 | 7/2007 | Berardi et al. |
| 7,286,818 B2 | 10/2007 | Rosenberg |
| 7,298,271 B2 | 11/2007 | Sprogis |
| 7,308,426 B1 | 12/2007 | Pitroda |
| 7,330,714 B2 | 2/2008 | Rosenberg |
| 7,349,885 B2 | 3/2008 | Gangi |
| 7,363,265 B2 | 4/2008 | Horgan |
| 7,401,731 B1 | 7/2008 | Pletz et al. |
| 7,469,151 B2 | 12/2008 | Khan et al. |
| 7,469,381 B2 | 12/2008 | Ording |
| 7,483,858 B2 | 1/2009 | Foran et al. |
| 7,494,055 B2 | 2/2009 | Fernandes et al. |
| 7,529,563 B1 | 5/2009 | Pitroda |
| 7,571,139 B1 | 8/2009 | Giordano et al. |
| 7,581,678 B2 | 9/2009 | Narendra et al. |
| 7,613,628 B2 | 11/2009 | Ariff et al. |
| 7,631,810 B2 | 12/2009 | Liu et al. |
| 7,685,037 B2 | 3/2010 | Reiners et al. |
| 7,693,752 B2 | 4/2010 | Jaramillo |
| 7,702,578 B2 | 4/2010 | Fung et al. |
| 7,708,198 B2 | 5/2010 | Gangi |
| 7,712,658 B2 | 5/2010 | Gangi |
| 7,775,430 B2 | 8/2010 | Lin |
| 7,802,264 B2 | 9/2010 | Robertson et al. |
| 7,805,615 B2 | 9/2010 | Narendra et al. |
| 7,809,652 B2 | 10/2010 | Dixon et al. |
| 7,818,727 B2 | 10/2010 | Wilkinson et al. |
| 7,828,214 B2 | 11/2010 | Narendra et al. |
| 7,856,377 B2 | 12/2010 | Cohagan et al. |
| 7,864,163 B2 | 1/2011 | Ording et al. |
| 7,865,414 B2 | 1/2011 | Fung et al. |
| 7,890,422 B1 | 2/2011 | Hirka et al. |
| 7,922,083 B2 | 4/2011 | Harrison et al. |
| 7,942,337 B2 | 5/2011 | Jain |
| 7,954,715 B2 | 6/2011 | Narendra et al. |
| 7,954,716 B2 | 6/2011 | Narendra et al. |
| 7,954,717 B2 | 6/2011 | Narendra et al. |
| 7,961,101 B2 | 6/2011 | Narendra et al. |
| 7,967,215 B2 | 6/2011 | Kumar et al. |
| 7,991,158 B2 | 8/2011 | Narendra et al. |
| 7,996,288 B1 | 8/2011 | Stolfo |
| 8,060,449 B1 | 11/2011 | Zhu |
| 8,069,121 B2 | 11/2011 | Goodrich et al. |
| 8,072,331 B2 | 12/2011 | Narendra et al. |
| 8,083,145 B2 | 12/2011 | Narendra et al. |
| 8,091,786 B2 | 1/2012 | Narendra et al. |
| 8,131,645 B2 | 3/2012 | Lin et al. |
| 8,140,418 B1 | 3/2012 | Casey et al. |
| 8,171,525 B1 | 5/2012 | Pelly et al. |
| 8,196,131 B1 | 6/2012 | Von Behren et al. |
| 8,326,758 B2 | 12/2012 | Bennett et al. |
| 8,392,328 B2 | 3/2013 | Shah et al. |
| 8,396,808 B2 | 3/2013 | Greenspan |
| 8,429,046 B2 | 4/2013 | Pitroda |
| 8,776,189 B2 | 7/2014 | Jain |
| 8,875,228 B2 | 10/2014 | Gargiulo et al. |
| 9,104,887 B2 | 8/2015 | Gargiulo |
| 9,323,945 B2 | 4/2016 | Gargiulo et al. |
| 9,544,759 B2 | 1/2017 | Gargiulo |
| 2002/0040936 A1 | 4/2002 | Wentker et al. |
| 2002/0049631 A1 | 4/2002 | Williams |
| 2002/0082921 A1 | 6/2002 | Rankin |
| 2002/0152156 A1 | 10/2002 | Tyson-Quah |
| 2002/0174025 A1 | 11/2002 | Hind et al. |
| 2002/0179703 A1 | 12/2002 | Allen |
| 2003/0009382 A1 | 1/2003 | D'Arbeloff et al. |
| 2003/0061157 A1 | 3/2003 | Hirka et al. |
| 2003/0083042 A1 | 5/2003 | Abuhamdeh |
| 2003/0115126 A1 | 6/2003 | Pitroda |
| 2003/0126094 A1 | 7/2003 | Fisher et al. |
| 2003/0132298 A1 | 7/2003 | Swartz et al. |
| 2003/0200489 A1 | 10/2003 | Hars |
| 2004/0024703 A1 | 2/2004 | Roskind |
| 2004/0073519 A1 | 4/2004 | Fast |
| 2004/0143550 A1 | 7/2004 | Creamer et al. |
| 2004/0148255 A1 | 7/2004 | Beck et al. |
| 2004/0166839 A1 | 8/2004 | Okkonen et al. |

(56) References Cited

U.S. PATENT DOCUMENTS

| | | |
|---|---|---|
| 2004/0186768 A1 | 9/2004 | Wakim et al. |
| 2005/0004866 A1 | 1/2005 | Bonalle et al. |
| 2005/0171898 A1 | 8/2005 | Bishop et al. |
| 2005/0186954 A1 | 8/2005 | Kenney |
| 2005/0191968 A1 | 9/2005 | Tabayashi et al. |
| 2005/0199714 A1 | 9/2005 | Brandt et al. |
| 2005/0222961 A1 | 10/2005 | Staib et al. |
| 2005/0234769 A1 | 10/2005 | Jain et al. |
| 2005/0247777 A1 | 11/2005 | Pitroda |
| 2005/0251446 A1 | 11/2005 | Jiang et al. |
| 2006/0149665 A1 | 7/2006 | Weksler |
| 2006/0178937 A1 | 8/2006 | Rau et al. |
| 2006/0287004 A1 | 12/2006 | Fuqua |
| 2007/0014407 A1 | 1/2007 | Narendra et al. |
| 2007/0014408 A1 | 1/2007 | Narendra et al. |
| 2007/0095892 A1 | 5/2007 | Lyons et al. |
| 2007/0170247 A1 | 7/2007 | Friedman |
| 2007/0198432 A1 | 8/2007 | Pitroda et al. |
| 2007/0265961 A1 | 11/2007 | Shah et al. |
| 2007/0288745 A1 | 12/2007 | Kwan et al. |
| 2008/0015988 A1 | 1/2008 | Brown et al. |
| 2008/0306849 A1 | 12/2008 | Johnson, Jr. et al. |
| 2008/0319887 A1 | 12/2008 | Pizzi et al. |
| 2009/0037333 A1 | 2/2009 | Flitcroft et al. |
| 2009/0098854 A1 | 4/2009 | Park et al. |
| 2009/0108064 A1 | 4/2009 | Fernandes et al. |
| 2009/0149192 A1 | 6/2009 | Vargas et al. |
| 2009/0164322 A1 | 6/2009 | Khan et al. |
| 2009/0172678 A1 | 7/2009 | Branca, Jr. et al. |
| 2009/0192935 A1 | 7/2009 | Griffin et al. |
| 2009/0240620 A1 | 9/2009 | Kendrick et al. |
| 2009/0313143 A1 | 12/2009 | Darensbourg et al. |
| 2010/0036770 A1 | 2/2010 | Fourez et al. |
| 2010/0070649 A1 | 3/2010 | Ng |
| 2010/0082481 A1 | 4/2010 | Lin et al. |
| 2010/0094753 A1 | 4/2010 | Carlson et al. |
| 2010/0114739 A1 | 5/2010 | Johnston |
| 2010/0138518 A1 | 6/2010 | Aiglstorfer et al. |
| 2010/0174595 A1 | 7/2010 | Aaltonen et al. |
| 2010/0188975 A1 | 7/2010 | Raleigh |
| 2010/0198728 A1 | 8/2010 | Aabye et al. |
| 2010/0211445 A1 | 8/2010 | Bodington |
| 2010/0241494 A1 | 9/2010 | Kumar et al. |
| 2010/0257040 A1 | 10/2010 | Hunt |
| 2010/0291896 A1 | 11/2010 | Corda |
| 2010/0291904 A1 | 11/2010 | Musfeldt et al. |
| 2010/0306531 A1 | 12/2010 | Nahari |
| 2010/0312636 A1 | 12/2010 | Coulter et al. |
| 2011/0006113 A1 | 1/2011 | Uchikura |
| 2011/0029786 A1 | 2/2011 | Raffard et al. |
| 2011/0055047 A1 | 3/2011 | Fox |
| 2011/0073663 A1 | 3/2011 | Narendra et al. |
| 2011/0087610 A1 | 4/2011 | Batada et al. |
| 2011/0113473 A1 | 5/2011 | Corda et al. |
| 2011/0127324 A1 | 6/2011 | Hirka et al. |
| 2011/0131133 A1 | 6/2011 | Hirka et al. |
| 2011/0145152 A1 | 6/2011 | McCown et al. |
| 2011/0151836 A1 | 6/2011 | Dadu et al. |
| 2011/0161188 A1 | 6/2011 | Roberts |
| 2011/0171996 A1 | 7/2011 | Narendra et al. |
| 2011/0180598 A1 | 7/2011 | Morgan et al. |
| 2011/0191149 A1 | 8/2011 | Blackhurst et al. |
| 2011/0218849 A1 | 9/2011 | Rutigliano et al. |
| 2011/0223972 A1 | 9/2011 | Narendra et al. |
| 2011/0231238 A1 | 9/2011 | Khan et al. |
| 2011/0238510 A1 | 9/2011 | Rowen et al. |
| 2011/0244796 A1 | 10/2011 | Khan et al. |
| 2011/0269438 A1 | 11/2011 | Narendra et al. |
| 2011/0271044 A1 | 11/2011 | Narendra et al. |
| 2011/0272468 A1 | 11/2011 | Narendra et al. |
| 2011/0272469 A1 | 11/2011 | Narendra et al. |
| 2011/0282780 A1 | 11/2011 | French et al. |
| 2011/0289001 A1 | 11/2011 | Bishop et al. |
| 2011/0320345 A1 | 12/2011 | Taveau et al. |
| 2012/0047237 A1 | 2/2012 | Arvidsson et al. |
| 2012/0064828 A1 | 3/2012 | Khan et al. |
| 2012/0089520 A1 | 4/2012 | Mardikar |
| 2012/0109681 A1 | 5/2012 | Chapman et al. |
| 2012/0109764 A1 | 5/2012 | Martin et al. |
| 2012/0171992 A1 | 7/2012 | Cheong et al. |
| 2012/0197773 A1 | 8/2012 | Grigg et al. |
| 2012/0231736 A1 | 9/2012 | Amiel et al. |
| 2012/0259768 A1 | 10/2012 | Mukherjee |
| 2012/0267432 A1 | 10/2012 | Kuttuva |
| 2012/0300932 A1 | 11/2012 | Cambridge et al. |
| 2012/0304255 A1 | 11/2012 | Carnes |
| 2012/0323664 A1 | 12/2012 | Klems |
| 2013/0024289 A1 | 1/2013 | Cueli et al. |
| 2013/0060618 A1 | 3/2013 | Barton et al. |
| 2013/0080227 A1 | 3/2013 | Maskatia et al. |
| 2013/0111546 A1 | 5/2013 | Gargiulo et al. |
| 2013/0111599 A1 | 5/2013 | Gargiulo |
| 2014/0040126 A1 | 2/2014 | Andrews et al. |
| 2014/0082056 A1 | 3/2014 | Gargiulo |
| 2014/0164475 A1 | 6/2014 | Gargiulo |
| 2015/0007345 A1 | 1/2015 | Gargiulo et al. |
| 2015/0310223 A1 | 10/2015 | Gargiulo |
| 2017/0017956 A1 | 1/2017 | Gargiulo |
| 2017/0213051 A1 | 7/2017 | Gargiulo |

FOREIGN PATENT DOCUMENTS

| | | |
|---|---|---|
| EP | 1 153 375 B1 | 1/2003 |
| EP | 0 766 852 B1 | 8/2004 |
| EP | 1 412 890 A4 | 11/2004 |
| EP | 1 477 943 A2 | 11/2004 |
| EP | 1 222 503 A4 | 12/2004 |
| EP | 2 043 060 A1 | 4/2009 |
| EP | 2 048 591 A1 | 4/2009 |
| EP | 2 306 684 A1 | 4/2011 |
| JP | 2004-102784 A | 4/2004 |
| JP | 2007-288494 A | 11/2007 |
| JP | 2010-534879 A | 11/2010 |
| KR | 10-2008-0096722 A | 11/2008 |
| KR | 10-2012-0046376 A | 5/2012 |
| WO | 2001/018629 A3 | 5/2001 |
| WO | 2003/012717 A1 | 2/2003 |
| WO | 2009/013700 A2 | 1/2009 |
| WO | 2009/144612 A1 | 12/2009 |
| WO | 2010/050652 A1 | 5/2010 |
| WO | 2010/084081 A1 | 7/2010 |
| WO | 2010/120222 A1 | 10/2010 |
| WO | 2012/042262 A1 | 4/2012 |
| WO | 2012/091349 A2 | 7/2012 |
| WO | 2013/063353 A1 | 5/2013 |
| WO | 2013/066620 A1 | 5/2013 |
| WO | 2013/066621 A1 | 5/2013 |
| WO | 2014/022383 A1 | 2/2014 |
| WO | 2014/047069 A1 | 3/2014 |

OTHER PUBLICATIONS

"Chinese Office Action issued in Chinese Application No. 201480035608.6", dated Feb. 3, 2019, 8 pages of English Translation and 6 pages of Chinese Office Action.

U.S. Appl. No. 13/731,090 to Mark William Andrews et al. filed Dec. 30, 2012.

U.S. Appl. No. 14/183,137, to Michael J. Gargiulo filed Feb. 18, 2014.

U.S. Appl. No. 15/279,975, to Michael J. Gargiulo filed Sep. 29, 2016.

"Chinese Office Action issued in Chinese Application No. 201380050257.1", dated Oct. 31, 2017, 06 pages of English Translation and 06 pages of Chinese Office Action.

"Chinese Office Action issued in Chinese Application No. 201380050257.1", dated May 14, 2018, 5 pages of Office Action and 7 pages of English Translation.

"Chinese Office Action issued in Chinese Application No. 201480035608.6", dated Feb. 11, 2018, 5 pages of English Translation and 4 pages of Chinese Office Action.

(56) References Cited

OTHER PUBLICATIONS

"Chinese Office Action issued in Chinese Application No. 201480035608.6", dated Aug. 14, 2017, 6 pages of English Translation and 6 pages of Chinese Office Action.
"Notice of Allowance received for U.S. Appl. No. 13/653,160, dated Apr. 13, 2015", 7 pages.
"Notice of Allowance received for Japanese Patent Application No. 2014-538836, dated Apr. 20, 2015", 3 pages Japanese NOA only.
ACONYTE Smart Solutions, "Mobile Application Management", May 1, 2012, XP055050399, 6 pages.
Bai, "International Preliminary Report on Patentability issued in International Application No. PCT/US2013/052708", dated Feb. 12, 2015, 7 pages.
Campbell, "Lewinsky Scandal Ends as Clinton is Disbarred", dated Oct. 1, 2001, 2 pages.
Campen, "U.S. Office Action issued in copending U.S. Appl. No. 13/545,702, filed Jul. 10, 2012", dated Jun. 17, 2013, 14 pages.
Colbert, "Office Action issued in copending U.S. Application No. 13/759,003, filed Feb. 4, 2013", dated Jun. 6, 2013, 24 pages.
De Pol, "Australian Office Action issued in Australian Application No. 2016203535", dated Mar. 15, 2017, 2 pages.
Di Felice, "International Search Report and Written Opinion issued in International Application No. PCT/US2013/060189", dated Nov. 22, 2013, 9 pages.
Feng, "Chinese Office Action issued in Chinese Application No. 201280059706.4", dated Jun. 24, 2016, 3 pages of English Translation and 5 pages of Chinese Office Action.
FINEXTRA Research, "Aconite launches Mobile Application Management", Oct. 26, 2011, XP055050391, 2 pages.
Gee, "U.S. Notice of Allowance issued in copending U.S. Appl. No. 14/487,433, filed Sep. 16, 2014", dated Dec. 9, 2015, 9 pages.
Gee, "U.S. Office Action issued in copending U.S. Appl. No. 14/487,433, filed Sep. 16, 2014", dated Aug. 17, 2015", 19 pages.
Gee, "U.S. Office Action issued in copending U.S. Appl. No. 14/487,433, filed Sep. 16, 2014, dated May 8, 2015", 14 pages.
Gee, "U.S. Office Action issued in copending U.S. Appl. No. 15/073,064, filed Mar. 10, 2015", dated Apr. 3, 2017, 17 pages.
Global Platform Inc, "Global Platform—Card Specification,", Global Platform Inc., version 2.1.1, Mar. 2003, pp. 1-237.
Global Platform Inc, "Global Platform's Proposition for NFC Mobile: Secure Element Management and Messaging,", GlobalPlatform Inc., Apr. 2009, pp. 1-36.
Globalplatform Inc.,"GlobalPlatform Card Contactless Services Card Specification v2.2—Amendment C", GlobalPlatform Inc., version 1.0., Feb. 2010, pp. 1-77.
Globalplatform Inc., "GlobalPlatform—Card Specification,", GlobalPlatform Inc., version 2.2, Mar. 2006, pp. 1-375.
Johnson, "Office Action issued in copending U.S. Appl. No. 13/717,295, filed Dec. 17, 2012", dated Feb. 28, 2013, 13 pages.
Kim, "International Search Report and Written Opinion issued in International Application No. PCT/US2013/052708", dated Nov. 19, 2013, 10 pages.
Kim, "Korean Office Action issued in Korean Application No. 10-2014-7014377 dated Sep. 24, 2014", 3 pages of English Translation and 3 pages of Korean Office Action.
Kim, Dong-Sung, "Notice of Allowance received for Korean Patent Application No. 10-2014-7014377, dated Jan. 22, 2015,", 1 pages of English Translation and 2 pages of Korean NOA.
Lau, "Canada Office Action issued in Canada Application No. 2854276 dated Aug. 26, 2015", 4 pages.
Lau, "Canada Office Action issued in Canada Application No. 2854277 dated Nov. 21, 2014", 5 pages.
Lau, "Canada Office Action received for Canada Patent Application No. 2,854,276", dated Feb. 13, 2018, 4 pages.
Lee, "Korean Office Action issued in Korean Application No. 10-2014-7035460", dated Jul. 30, 2015, 6 pages of Korean Office Action only.
Louie, "Notice of Allowance received for U.S. Appl. No. 13/653,145, dated Aug. 19, 2014", 8 pages.
Louie, "U.S. Office Action issued in copending U.S. Appl. No. 13/653,145, filed Oct. 16, 2012, dated Jun. 17, 2013", 7 pages.
Louie, "U.S. Office Action issued in copending U.S. Appl. No. 13/653,145, filed Oct. 16, 2012, dated May 2, 2014", 9 pages.
Louie, "U.S. Office Action issued in copending U.S. Appl. No. 13/653,145, filed Oct. 16, 2012, dated Oct. 25, 2013", 8 pages.
McCosker, "Australian Office Action issued in Australian Application No. 2012332956 dated Apr. 20, 2015", 3 pages.
Moon, "International Preliminary Report on Patentability issued in International Application No. PCT/US2013/060189", dated Apr. 2, 2015, 14 pages.
"Office Action received for Mexican Patent Application No. MX/a/2014/005180", dated Jul. 10, 2015, 2 pages.
Nakazato, "Japanese Office Action issued in Japanese Application No. 2014-538837 dated Apr. 27, 2015", 12 pages of English Translation and 11 pages of Japanese Office Action.
Nakazato, "Japanese Office Action issued in Japanese Application No. 2014-538837 dated Oct. 5, 2015", 6 pages of English Translation and 6 pages of Japanese Office Action.
Nega, "U.S. Office Action issued in copending U.S. Appl. No. 13/653,160, filed Oct. 16, 2012", dated Oct. 21, 2014 10 pages.
Ng, "Australian Office Action issued in Australian Application No. 2015234304", dated Nov. 17, 2015, 3 pages.
Nguyen, "Office Action issued in copending U.S. Appl. No. 13/784,808, filed Mar. 4, 2013", dated Jul. 15, 2013, 20 pages.
Nora, "International Preliminary Report on Patentability issued in International Application No. PCT/US2014/016922", dated Dec. 3, 2015, 7 pages.
Omogbenigun, "Office Action issued in Australian Application No. 2013318245", dated Aug. 14, 2015, 3 pages.
Omogbenigun, "Office Action issued in Australian Application No. 2013318245",dated Jul. 8, 2015, 3 pages.
"International Preliminary Report on Patentability and Written Opinion Received for PCT Patent Application No. PCT/US2012/060442", dated May 15, 2014, 18 pages.
"International Search Report and Written Opinion received for PCT Patent Application No. PCT/US2012/060442", dated Jan. 28, 2013, 11 pages.
"International Preliminary Report on Patentability and Written Opinion Received for PCT Patent Application No. PCT/US2012/060445", dated May 15, 2014, 14 pages.
International Search Report and Written Opinion received for PCT Patent Application No. PCT/US2012/060445, dated Jan. 28, 2013, 10 pages.
International Search Report and Written Opinion of the International Searching Authority for International Patent Application No. PCT/US2013/028697, dated May 23, 2013, 8 pages.
International Search Report and Written Opinion of the International Searching Authority for International Patent Application No. PCT/US2013/033467, dated Jul. 4, 2013, 8 pages.
International Search Report and Written Opinion of the International Searching Authority for International Patent Application No. PCT/US2013/035406, dated Jul. 19, 2013, 8 pages.
Quittner, "PayPal Seeks to Cut Out Card Companies with New Plastic", PayPal inc., Published in Bank Technology News, Oct. 18, 2011, 2 pages.
Roberti, "Extended European Search Report issued in European Application No. 14800349.4", dated Dec. 15, 2016, 9 pages.
Shaikh, "Office Action issued in copending U.S. Appl. No. 13/802,705, filed Mar. 13, 2013", dated Jul. 18, 2013, 11 pages.
Shingles, "U.S. Office Action issued in copending U.S. Appl. No. 14/029,463, filed Sep. 17, 2013", dated Dec. 3, 2015, 8 pages.
Trotter, "U.S. Office Action issued in copending U.S. Appl. No. 13/731,090, filed Feb. 6, 2014", dated Oct. 17, 2017, 14 pages.
Trotter, "U.S. Office Action issued in copending U.S. Appl. No. 13/731,090, filed Dec. 30, 2012", dated Nov. 3, 2015, 14 pages.
Trotter, "U.S. Office Action issued in copending U.S. Appl. No. 13/731,090, filed Dec. 30, 2012", dated Apr. 3, 2015, 15 pages.
Trotter, "U.S. Office Action issued in copending U.S. Appl. No. 13/731,090, filed Dec. 30, 2012", dated Jun. 2, 2016, 13 pages.
Trotter, "U.S. Office Action issued in copending U.S. Appl. No. 13/731,090, filed Dec. 30, 2012", dated Apr. 5, 2017, 14 pages.

(56) References Cited

OTHER PUBLICATIONS

Trotter, "U.S. Office Action issued in copending U.S. Appl. No. 13/731,090, filed Dec. 30, 2012", dated Dec. 13, 2016, 14 pages.
Tsujimoto, "Japanese Office Action issued in Japanese Application No. 2014-538837", dated Sep. 25, 2017, 03 pages of English Translation and 03 pages of Japanese Office Action.
Vergas, "Mexican Office Action issued in Mexican Application No. MX/a/2014/005181", dated May 20, 2016, 2 pages of English Translation and 2 pages of Mexican Office Action.
Weidmann, "Extended European Search Report issued in European Application No. 13825094.9", dated Dec. 9, 2015, 8 pages.
Wikipedia, "Disbarment", From Wikipedia, the free encyclopedia, Dec. 24, 2010, 4 pages.
Woldemariam, "Office Action issued in copending U.S. Appl. No. 14/183,137, filed Feb. 18, 2014", dated Nov. 4, 2015, 10 pages.
Ziegle, "Office Action issued in copending U.S. Appl. No. 13/658,783, filed Oct. 23, 2012", dated Jul. 11, 2013, 17 pages.
Woldemariam, "U.S. Office Action issued in copending U.S. Appl. No. 15/279,975, filed Sep. 29, 2016", dated Jan. 7, 2019, 10 pages.
Woldemariam, "U.S. Office Action issued in copending U.S. Appl. No. 15/279,975, filed Sep. 29, 2016", dated Jan. 23, 2018, 12 pages.
Woldemariam, "U.S. Office Action issued in copending U.S. Appl. No. 15/279,975, filed Sep. 29, 2016", dated Aug. 10, 2017, 15 pages.
Woldemariam, "U.S. Office Action issued in copending U.S. Appl. No. 15/481,420, filed Apr. 6, 2017", dated Jan. 24, 2018, 10 pages.
Woldemariam, "U.S. Office Action issued in copending U.S. Appl. No. 15/481,420, filed Apr. 6, 2017", dated Aug. 23, 2017, 12 pages.
Yang, "International Search Report and Written Opinion issued in International Application No. PCT/US2014/016922", dated Jun. 24, 2014, 8 pages.
Yliuntinen, "3rd Party TSM Management of Sim Cards,", [online], Sep. 12, 2011, 4 pages.
Yoon, "Korean Office Action issued in Korean Application No. 10-2017-7021176", dated Aug. 21, 2017, 4 pages of English Translation and 3 pages of Korean Office Action.
Zhou, "Chinese Office Action issued in Chinese Application No. 201380050257.1", dated Mar. 1, 2017, 9 pages of English Translation and 8 pages of Chinese Office Action.
Ziegle, "Office Action issued in copending U.S. Appl. No. 13/658,783, filed Oct. 23, 2012", dated Mar. 5, 2013, 14 pages.
"Chinese Office Action issued in Chinese Application No. 201480035608.6", dated May 7, 2019, 9 pages of English Translation and 4 pages of Chinese Office Action.

MANAGING DEVICES ASSOCIATED WITH A DIGITAL WALLET ACCOUNT

CROSS-REFERENCE TO RELATED APPLICATIONS

This patent application claims priority to and is a continuation of U.S. patent application Ser. No. 13/731,090, filed Dec. 30, 2012, now issued as U.S. Pat. No. 10,127,533 and entitled "Managing Devices Associated with a Digital Wallet Account," which claims priority to U.S. Provisional Patent Application No. 61/678,089, filed Jul. 31, 2012 and entitled "Proxy Card System." This application claims priority to and hereby incorporates each above-identified application by reference herein in its entirety.

TECHNICAL FIELD

The present disclosure relates generally to digital wallet transactions, and more particularly to managing devices associated with a digital wallet account.

BACKGROUND

Digital wallet accounts can be configured by a user for transactions with merchants. The transactions can be conducted online or offline. Digital wallet accounts can be used for online purchases via the Internet with a user computing device. A digital wallet application module can be installed on a mobile computing device for use in offline purchases. For example, the user can utilize a digital wallet application module on a user computing device to make purchases at a merchant location via near field communication ("NFC"), BLUETOOTH, Wi-Fi, or other proximity communication technologies.

The digital wallet account can be associated with a proxy card account. Proxy card payment systems enable users to utilize a single card to access multiple financial accounts maintained by multiple issuers. The user receives a proxy card from the proxy card system and either creates a new proxy card system account or associates the proxy card with the user's digital wallet account already maintained by the proxy card system. The user then associates one or more financial card accounts with the proxy account. For example, the user can associate with the user's proxy card account multiple debit/credit cards maintained by multiple issuers (including the proxy card system operating as an issuer), stored value cards (for example, gift cards, prepaid cards, re-loadable transaction cards, exchange cards, and other forms of non-credit based value cards), loyalty cards or store rewards cards, value added service accounts (for example, coupons, vouchers for prepaid offers, redemption offers, and other forms of offers), peer-to-peer transaction accounts, bank accounts and/or other forms of financial card accounts.

In a conventional digital wallet application, the user is not able to disable a digital wallet application module on a different mobile user device or other user device. For example, a user might lose a mobile phone that has a digital wallet application module installed or have that cell phone stolen. The user does not have a manner of conveniently disabling or removing the user device from the list of authorized digital wallet devices.

SUMMARY

Techniques herein provide a computer-implemented method to manage user devices associated with a digital wallet account. A payment system employs a server configured for associating, using one or more computing devices, one or more user computing devices with a digital wallet account of a user, each of the associated one or more user computing devices being activated to conduct financial transactions with a merchant utilizing the digital wallet account; presenting the associated user computing devices in a list of associated user computing devices; receiving a request to deactivate a particular user computing device from the list of associated user computing devices; deactivating the particular user computing device, the deactivation being sufficient to prevent the user computing device from conducting transactions with a merchant utilizing the digital wallet account; and presenting a deactivated status of the particular user computing device.

Another aspect of the example embodiments described herein provides a computer program product that is installed on a server to manage user devices associated with a digital wallet account. The computer program product includes a non-transitory computer-readable storage device having computer-readable program instructions stored therein. The computer-readable program instructions include computer program instructions for associating each of the associated one or more user computing devices being activated to conduct financial transactions with a merchant utilizing the digital wallet account; presenting the associated user computing devices in a list of associated user computing devices; receiving a request to deactivate a particular user computing device from the list of associated user computing devices; and deactivating the particular user computing device, the deactivation being sufficient to prevent the user computing device from conducting transactions with a merchant utilizing the digital wallet account.

These and other aspects, objects, features and advantages of the example embodiments will become apparent to those having ordinary skill in the art upon consideration of the following detailed description of illustrated example embodiments.

DETAILED DESCRIPTION OF THE EXAMPLE EMBODIMENTS

Overview

The example embodiments provide a digital wallet account and one or more user devices utilized to make transactions with the digital wallet account. To receive the benefits of the techniques described herein, in certain embodiments, the user will install an application, use a particular service, or otherwise engage in the techniques herein. In the example embodiment, a digital wallet account includes specified information for one or more financial accounts, including, but not limited to debit cards, credit cards, stored value cards, loyalty/rewards cards, bank accounts, peer-to-peer transaction accounts, stored value accounts, and coupons (including purchased offers and other offers), each accessible by a digital wallet application module or other embodiment of the digital wallet account. In an example embodiment, the user can access the digital wallet account using an application operating on a mobile communications device or other device equipped with a web browser or other communication module and connected to the Internet. The digital wallet account can be hosted by a payment processing system or any other suitable system.

In an example embodiment, the digital wallet account can utilize or represent a proxy card account. The digital wallet account can store the proxy card account or any suitable representation or operations of the proxy card account. The proxy card account can be a function of the digital wallet account or can represent the system by which the digital wallet account operates. Alternatively, a proxy card account can be just one of multiple accounts managed and utilized by the digital wallet application module.

In an example embodiment, a front-end "kill-switch" provides an interface for users to display, monitor, and deactivate their wireless and physical proxy card devices on a per-device basis. This implementation provides security and control to payment processing system users.

Wireless devices and other user devices are added to a digital wallet account when the user device sends a request to the payment processing system to add the user device. User devices added to the digital wallet account can include any computing device available to a user including a desktop computer, laptop computer, tablet computer, a television with one or more processors embedded therein and/or coupled thereto, smart phone, handheld computer, personal digital assistant ("PDA"), or any other wired or wireless, processor-driven device. The digital wallet account may be represented on a device as a digital wallet application module, a digital wallet application module operating on a website or server, a representation on a user interface of the payment processing system, or any other suitable embodiment of the digital wallet account.

Additionally or alternatively, the digital wallet account may include a physical payment card, including a proxy card, or other physical tool for conducting transactions, such as a magnetic stripe card, smartcard, RFID device, or other suitable tools. Throughout the specification, "digital wallet application module" will be intended to encompass all embodiments of the digital wallet account on user devices, including physical cards. Additionally, "user devices" will be intended to encompass all suitable devices used to host a digital wallet account embodiment, including physical cards.

In an example embodiment, a request for adding a user device is required when a digital wallet application module is first installed and after each reset. Thus, the first activation is when the application is first set up on the user device. A subsequent reset and re-activation of the application will be considered a new activation. In an example embodiment, re-activation of a deactivated device is performed by reinstalling and setting up the digital wallet application module on the user's mobile communication device. In an example embodiment, the user may be required to re-enter their financial payment card information.

In an example embodiment, a page on a user interface associated with a digital wallet account provides a listing of user devices associated with the digital wallet account. The device listing will indicate the enabled user devices that the user owns and the activation state of each device. The device list contains all of the information required to render a virtual representation of the device to the user. For example, the device list may show information indicating the device status such as the device name, the activation date, the last time a transaction was initiated, the activation status, a device image, an option to deactivate any active devices, an option to retry a deactivation if a previous attempt did not complete, and any other suitable displays or options.

In an example embodiment, the user can access the digital wallet account by logging onto the payment processing system website online, using a digital wallet application module on a user mobile communication device such as a user device, or by using any other suitable user interface system. The user may retrieve the status of all devices linked to the digital wallet account.

The user can select a user device to add to the digital wallet account by adding the user device details into a user interface of the digital wallet account. For example, the user can enter the phone number to a mobile user device and the digital wallet account can locate the appropriate user device over the network, via email, over a wired network, or via any other suitable manner. The user can select the device from a list of devices associated with the user. The user can select a device from a list of inactive devices. Any other suitable manner of selecting user devices to add to the digital wallet account can be employed.

The user can install the digital wallet application module on the user device. In an example embodiment, the payment system can transmit the digital wallet application module to the user device. In another example, the user device can locate the digital wallet application module on the Internet and download the application for the digital wallet application module. In another example, the user device can download the digital wallet application module from a website of the payment processing system. The user can install the digital wallet account in any other suitable manner.

In an alternative embodiment, the user device has installed a digital wallet application module before the user device is added to the device list of the digital wallet account. Additionally or alternatively, the user can use the digital wallet application module to add the device to the device list. For example, the user can open the digital wallet application and input the digital wallet account credentials to enter the digital wallet account. From the user device, the user can add the user device to the digital wallet account. For the purposes of fraud prevention, the user would be required to authenticate the addition of the user device.

When a user adds a user device to the device list on the digital wallet account, the digital wallet application module on the user device transmits a setup request to the payment processing system. If not previously authorized, the user can enter security information to authorize the addition.

The user device can then be added to the device list on the digital wallet account. The device list can display the user device on the list with any additional identification or visual representations of the user device that are configured by the user or the digital wallet account. For example, the device list can display the user device phone number, serial number, username, or any suitable alias or identification provided by the user or others. The device list can display a picture or other representation of the user device, such as a picture of the model of the device based on provided model numbers. Any other suitable display or identification can be used to represent the user device on the device list.

The device list can display the status of the user device as active or any suitable description of the status.

The user may desire to remove a user device from the digital wallet account. The user may desire to disable a digital wallet application module from a particular user device if that user device is stolen, lost, or otherwise has the security of the user device compromised. The user may desire to remove a user device if the user device is being traded, sold, or replaced. The user may desire to remove a user device if the user device is no longer going to be used for digital transactions or for any other suitable reason.

The user can open the device list on a user interface of the digital wallet account in the manner employed to add a device. The user can access the digital wallet account by logging onto the payment processing system website online, using a digital wallet application module on a mobile communication device, or by using any other suitable user interface system.

The user can select a user device to remove from the list. The user can identify the desired user device by selecting the representation of the user device from the list. For example, the user can click on a picture of the user device on the user interface. The user can tap a username or identifier of the user device on the user interface. The user can state a verbal identification of the device to select the user device. Any other suitable manner of selecting the user device from the list can be employed.

When deactivation is initiated, the digital wallet user interface being utilized transmits the deactivation request to the payment processing system and the user device that is being deactivated. The payment processing system can receive the request and deactivate the user device from a list of active devices within the payment processing system. The payment processing system will no longer honor requests for transactions from the digital wallet application module operating on the deactivated user device.

In an example embodiment, the user device that is being deactivated on the device list is not contacted to disable the digital wallet application module because it is not currently connected to a communication network. The deactivation can occur when the user device next achieves network access. That is, when the user device is again turned on, returned to a service area, or otherwise achieves a network connection, the instructions can be transmitted at that time to the device to be deactivated. If the user device successfully communicates with the payment processing system server, then the digital wallet application module on the user device is deactivated and the digital wallet application module can no longer be utilized for transactions using the digital wallet account of the user. In an alternate embodiment, the digital wallet user interface being utilized for the deactivation or the payment processing system transmits the deactivation request directly to the user device that is being deactivated.

The digital wallet application module also can be removed from a user device that has been deactivated from the digital wallet account. In an example embodiment, the digital wallet account can transmit instructions to the user device to delete the digital wallet application module, to delete the digital wallet account information, to delete financial account information from the user device, or to delete any other suitable information that could be used to make the digital wallet application module operable with the digital wallet account of the user. Additionally or alternatively, the user can manually delete the digital wallet application module or other information from the user device.

When deactivation is initiated, the user interface will provide a clear indication to the user of what is happening, and what, if any, further action must be taken. The user interface displays to the user that the deactivation is successful or if the deactivation is in progress. For example, the user interface can display that a device is partially disabled.

In certain instances, a partially disabled state can be created when the payment processing system can be updated, but not the user device. When the digital wallet account is unable to contact the user device, the digital wallet application module on the user device cannot be deleted or disabled. Moreover, if the user has a stored value card on a user device that is partially disabled, then the user may still be vulnerable to charges on the stored value card, and the user will need to contact the issuer of the stored value card to disable the card. The user interface will display to the user that the digital wallet account will retry the deactivation button until a complete deactivation is achieved or the digital wallet account is requested to discontinue the deactivation.

If a user device has been deactivated on the digital wallet account at the payment processing system but the digital wallet application module on the user device has not been deactivated, a transaction might be attempted by a person in possession of the user device. For example, if a user device is stolen, the person with the stolen device may attempt a transaction. The payment processing system is notified of the transaction request. However, the payment processing system determines that the user requested to have the user device deactivated on the user device list. The payment processing system declines the transaction and attempts again to deactivate the digital wallet application module on the user device.

The user interface also can allow the user to remove any deactivated devices from the list of devices, or the removal can occur automatically. Devices that have been deactivated can appear in the list in a disabled state until the user manually deletes them. Additionally or alternatively, the user can leave the deactivated devices on the list of devices or store the deactivated devices in a list of deactivated or unused devices.

Additionally or alternatively, the deactivated device can remain on the list of devices but remain hidden from view until the user requests that hidden devices be displayed. In an example embodiment, devices that are marked hidden will not be shown, except when showing a historic device view is requested.

Example System Architectures

Turning now to the drawings, in which like numerals represent like (but not necessarily identical) elements throughout the figures, example embodiments are described in detail.

Figure 1:
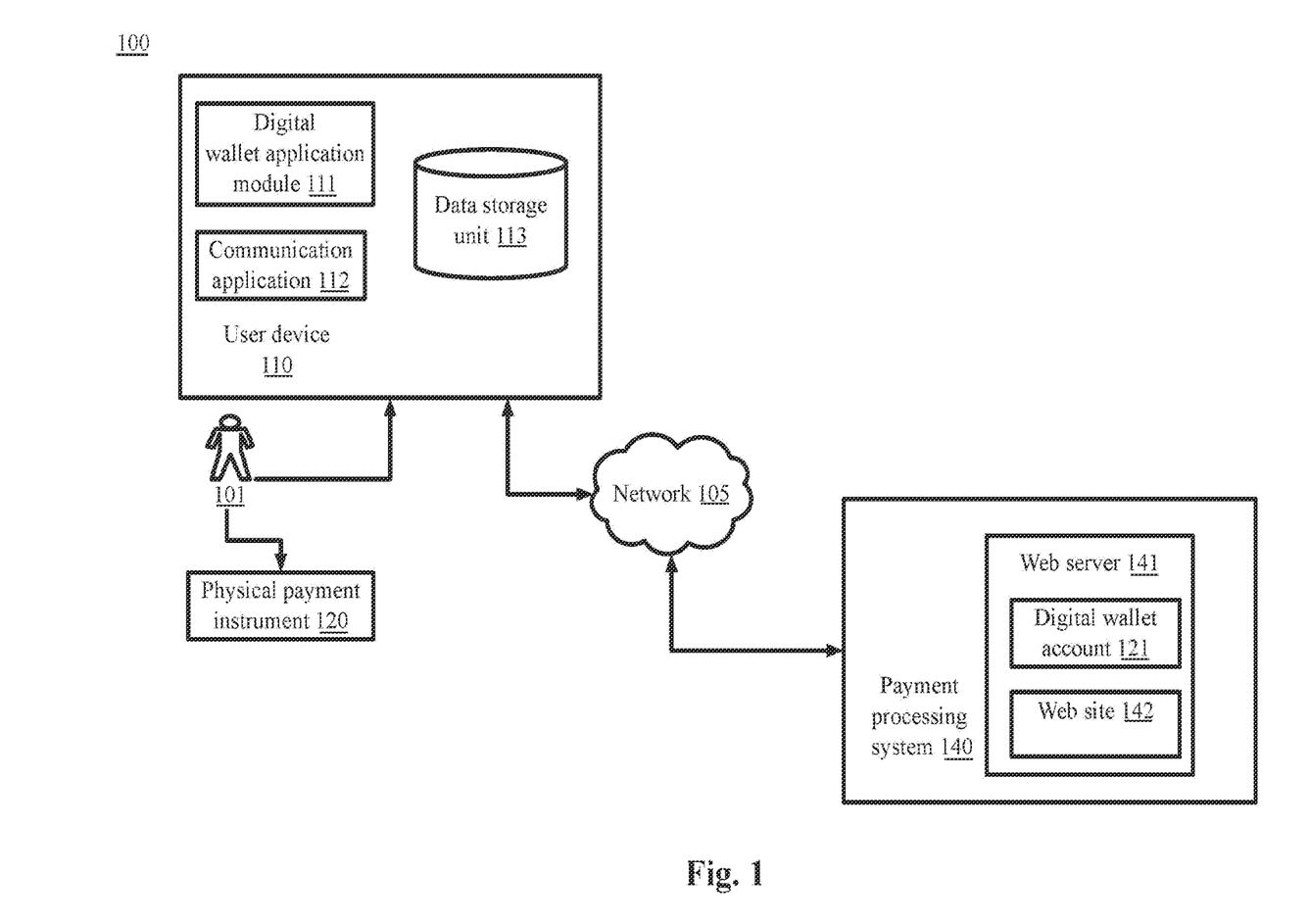
FIG. 1 is a block diagram depicting a system for managing devices associated with a digital wallet account, in accordance with certain example embodiments.

FIG. 1 is a block diagram depicting a system for managing devices associated with a digital wallet account, in accordance with certain example embodiments. As depicted in FIG. 1, the system 100 includes network devices 110 and 140 that are configured to communicate with one another via one or more networks 105.

Each network 105 includes a wired or wireless telecommunication means by which network devices (including devices 110 and 140) can exchange data. For example, each network 105 can include a local area network ("LAN"), a wide area network ("WAN"), an intranet, an Internet, a mobile telephone network, or any combination thereof. Throughout the discussion of example embodiments, it should be understood that the terms "data" and "information" are used interchangeably herein to refer to text, images, audio, video, or any other form of information that can exist in a computer-based environment.

Each network device 110 and 140 includes a device having a communication module capable of transmitting and receiving data over the network 105. For example, each network device 110 and 140 can include a server, desktop computer, laptop computer, tablet computer, a television with one or more processors embedded therein and/or coupled thereto, smart phone, handheld computer, personal digital assistant ("PDA"), or any other wired or wireless, processor-driven device. In the example embodiment depicted in FIG. 1, the network devices 110 and 140 are operated by end-users or consumers on user devices and payment processing system operators respectively.

The user 101 can use the communication application 112 on a user mobile device 110, such as a web browser application or a stand-alone application, to view, download, upload, or otherwise access documents or web pages via a distributed network 105. The network 105 includes a wired or wireless telecommunication system or device by which network devices (including devices 110 and 140) can exchange data. For example, the network 105 can include a local area network ("LAN"), a wide area network ("WAN"), an intranet, an Internet, storage area network (SAN), personal area network (PAN), a metropolitan area network (MAN), a wireless local area network (WLAN), a virtual private network (VPN), a cellular or other mobile communication network, Bluetooth, NFC, or any combination thereof or any other appropriate architecture or system that facilitates the communication of signals, data, and/or messages.

The communication applications 112 can interact with web servers or other computing devices connected to the network 105, including the point of sale terminal of the merchant system (not shown), the merchant server of a merchant system, the web server 141 of the payment processing system 140.

The user mobile device 110 may include a digital wallet application module 111. The digital wallet application module 111 can encompass any application, hardware, software, or process the user devices 110 can employ to assist the user 101 in completing a purchase. A digital wallet application module 111 can interact with a communication application 112 or can be embodied as a companion application of the communication application 112. As a companion application, a digital wallet application module 111 executes within a communication application 112. That is, a digital wallet application module 111 may be an application program embedded in a communication application 112.

The user mobile device 110 also includes a data storage unit 113 accessible by the digital wallet application module 111 and the communication application 112. The example data storage unit 113 can include one or more tangible computer-readable storage devices. The data storage unit 113 can be stored on the user mobile device 110 or can be logically coupled to the user mobile device 110. For example, the data storage unit 113 can include on-board flash memory and/or one or more removable memory cards or removable flash memory.

A user 101 can employ physical payment instrument 120 to initiate a transaction employing the digital wallet account 121, a proxy card account on the digital wallet account 121, a specified payment instrument operating on the digital wallet account 121, or any other payment instrument embodiment. In an example embodiment, a physical payment instrument 120 looks and/or functions in the same manner as a standard credit or debit card. For example, a physical payment instrument 120 may have the name of the user 101 and/or the account number of the user 101 listed on the front of the card. An example physical payment instrument 120 can include a magnetic stripe encoding the physical payment instrument account information of the user 101. In an example embodiment, the account information encoded in the magnetic stripe routes payment requests to the payment processing system 140 for processing.

In an alternative example embodiment, the physical payment instrument 120 can be a smartcard, RFID transmitter device, or any other suitable physical device capable of initiating a transaction with the digital wallet account of the user.

The user 101 may use the user mobile device 110 or user computing device to register the digital wallet application module 111, or the digital wallet account 121 and/or access the digital wallet account 121 account of the user 101. The user mobile device 110 may comprise appropriate technology that includes or is coupled to a web server (for example, a web browser application, or other suitable application for interacting with web page files).

The user 101 can use a web server 141 on the payment processing system 140 to view, register, download, upload, or otherwise access the payment processing system 140 via a website 142 and a communication network 105. The user 101 associates one or more registered payment instruments, including bank account debit cards, credit cards, gift cards, loyalty cards, coupons, offers, prepaid offers, peer-to-peer transaction accounts, store rewards cards, or other type of payment instrument that can be used to make a purchase or redeem value-added services with a digital wallet account 121 of the user 101. The payment processing system 140 also may function as the issuer for the associated financial payment instrument. The user's registration information is provided to the payment processing system 140. The user 101 also may use the web server 141 to define payment rules.

The user 101 may request a purchase from the merchant system (not pictured). In an example embodiment, the purchase is initiated by a wireless "tap" of the mobile device 110 with the POS terminal. In an alternative example embodiment, the purchase is initiated when the user 101 enters an account identification number at the POS terminal or in the user device 110. In another alternative example embodiment, the purchase is initiated online with the merchant server. The purchase may be initiated via the merchant website. In yet another alternative example embodiment, the purchase is initiated by use of a permanent/temporary virtual/physical token, QR code, bar code, or other suitable machine-readable medium captured by the terminal reader. The merchant's POS terminal can interact with an acquirer (or other third party payment processing companies), the card network, the proxy card system 140, and the payment instrument issuer.

Example Processes

The components of the example operating environment 100 are described hereinafter with reference to the example methods illustrated in FIGS. 2-3.

Figure 2:
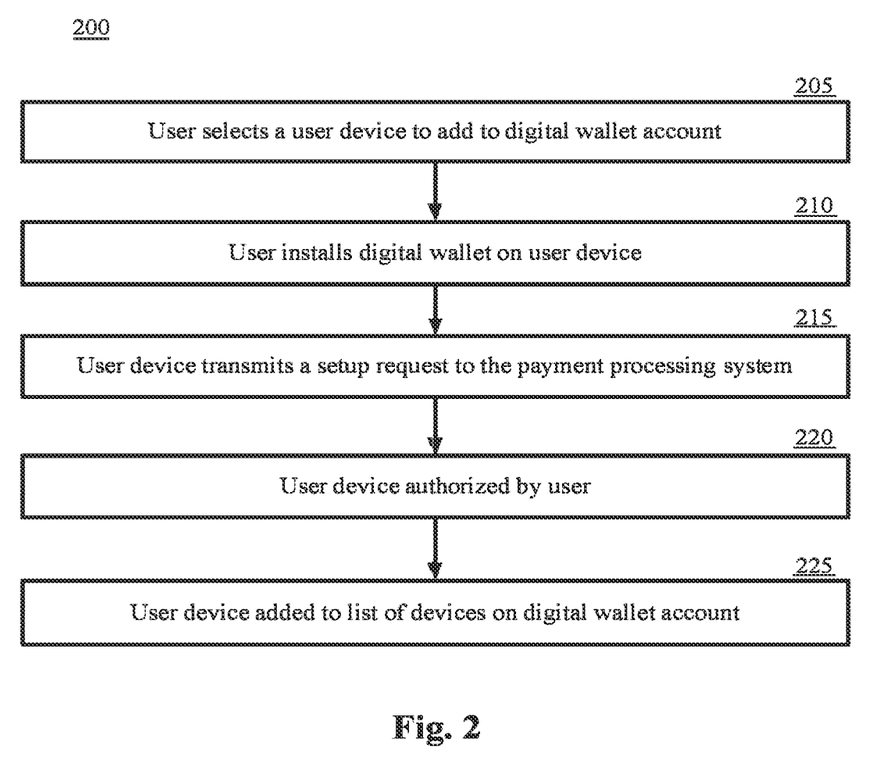
FIG. 2 is a block flow diagram depicting a method for adding a user device to a digital wallet account, in accordance with certain example embodiments.

FIG. 2 is a block flow diagram depicting a method 200 for adding a user device 110 to a digital wallet account 121, in accordance with certain example embodiments.

In block 205, the user 101 selects a user device to add to a digital wallet account. User devices 110 that the user 101 may desire to add to the digital wallet account 121 can include any of the user devices 110 describe previously including, desktop computer, laptop computer, tablet computer, a television with one or more processors embedded therein and/or coupled thereto, smart phone, handheld computer, personal digital assistant ("PDA"), or any other wired or wireless, processor-driven device. The digital wallet account 121 may be represented on a user device 110 as a digital wallet application module 111, a digital wallet application operating on a website or server, a representation on a user interface of the payment processing system 140, or any other suitable embodiment of the digital wallet account 121.

Additionally or alternatively, the user 101 selects a physical payment instrument 120 or other physical tool for conducting transactions, such as a smartcard, RFID device, to add to a digital wallet account. For example, the physical payment instrument 120 may be a card for accessing a proxy card account of the user 101. Throughout the specification, "digital wallet application module 111" will be intended to encompass all embodiments of the digital wallet account on user devices 110, including physical payment instruments 102. Additionally, "user devices 110" will be intended to encompass all suitable devices used to host a digital wallet account 121 embodiment, including physical payment instruments 102.

In block 210, the user installs a digital wallet application module 111 on a user device 110. The digital wallet application module 111 can be downloaded from a web server such as the web server 141 of the payment processing system 140. The digital wallet application module 111 may come installed on a new user device 110. The digital wallet application module 111 can be obtained from any other suitable source, such as a website on the Internet or a portable storage device such as a flash drive.

In block 215, the user device 110 transmits a setup request to the payment processing system 140. A request for adding a user device 110 is required when a digital wallet application module 111 is first installed and after each reset. Thus, the first activation is when the digital wallet application module 111 is first set up on the user device 110. A subsequent reset and re-activation of the digital wallet application module 111 will be considered a new activation. In an example embodiment, re-activation of a deactivated device 110 is performed by reinstalling and setting up the digital wallet application module 111 on the user device 110. In an example embodiment, the user 101 may be required to re-enter financial payment card information.

The digital wallet application module 111 can be installed on a user device 110 before being associated with a digital wallet account 121.

In block 220, the digital wallet application module 111 on the user device 110 is authorized by the user 101. In an example embodiment the user 101 must enter an authorization for the setup to be initiated by the payment processing system 140. That is, the payment processing system 140 can require a username and password, or other suitable authorization protocol, to begin the setup process for the digital wallet application module 111. In alternate example embodiments, the authorization of the user 101 can be required at any point of the setup process, such as before the installation of the digital wallet application module 111 or after the setup process has begun.

In block 225, the user device 110 is added to the list of devices on the digital wallet account 121. In an example embodiment, a page on a user interface of the digital wallet account 121 provides a listing of user devices associated with the digital wallet account 121. The device listing will indicate the enabled user devices 110 that the user owns and the activation state of each user device 110. The device list contains all of the information required to render a virtual representation of the user device 110 to the user 101. For example, the device list may show information indicating the device status such as the device 110 name, the activation date, the last time a transaction was initiated, the activation status, a device image, an option to deactivate any active devices 110, an option to retry a deactivation if a previous attempt did not complete, and any other suitable displays or options.

In an example embodiment, the user 101 can access the digital wallet account 121 by logging onto the payment processing system website 142 online, using a digital wallet application module 111 on a mobile user communication device such as a user device 110, or by using any other suitable user interface system. The user 101 may retrieve the status of all devices linked to the digital wallet account.

The user 101 can select a user device 110 to add to the digital wallet account 121 by adding the user device 110 details into a user interface on the digital wallet account 121. For example, the user 101 can enter the phone number to a mobile user device 110 and the digital wallet account 121 can locate the appropriate user device 110 over the network 105, via email, over a wired network, or via any other suitable manner. The user 101 can select the user device 110 from a list of devices associated with the user 101. The user 101 can select a user device 110 from a list of inactive devices. Any other suitable manner of selecting user devices to add to the digital wallet account can be employed.

If the digital wallet account 121 attempts to set up a new user device 110 that has not had the digital wallet application module 111 installed, then the digital wallet 121 can initiate installation. For example, the digital wallet account 121 can transmit the digital wallet application module to the user device. In another example, the user device can locate the digital wallet application on the Internet and download the application. Any other method can be utilized to install the digital wallet application module 111.

The device list can display the user device 110 with any additional identification or visual representations of the user device 110 that are configured by the user 101 or the digital wallet account 121. For example, the device list can display the user device phone number, serial number, username, or any suitable alias or identification provided by the user or others. The device list can display a picture or other representation of the user device 110, such as a picture of the model of the user device 110 based on provided model numbers. Any other suitable display or identification can be used to represent the user device on the device list.

Figure 3:
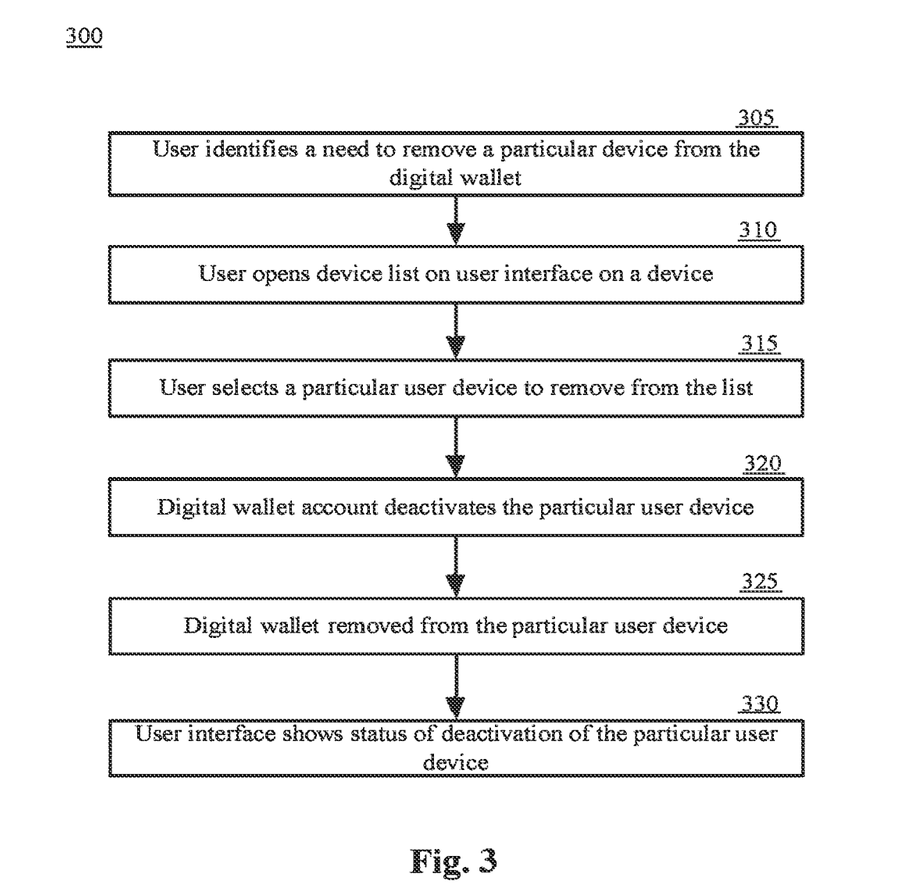
FIG. 3 is a block flow diagram depicting a method for disabling or removing a user device from a digital wallet account, in accordance with certain example embodiments.

FIG. 3 is a block flow diagram depicting a method 300 for removing a user device 110 from a digital wallet account 121, in accordance with certain example embodiments.

The user 101 can select a user device 110 that the user 101 no longer wants to have associated with the digital wallet account 121. The user can desire to remove a user 110 device if the device is stolen, lost, or otherwise has the security of the user device 110 compromised. The user 101 can desire to remove a user device 110 if the user device 110 is being traded, sold, or replaced. The user 101 can desire to remove a user device 110 if the user device 110 is no longer going to be used for digital transactions or for any other suitable reason.

In block 310, the user 101 can open the device list on a user interface of the digital wallet account 121 in the manner employed to add a user device 110. The user can access the digital wallet account 121 by logging onto the payment processing system website 142 online, using a digital wallet application module 111 on a user device 110, or by using any other suitable user interface system associated with the digital wallet account 121.

In block 315, the user 101 can select a user device 110 to remove from the device list. The user 101 can identify the desired user device 110 by selecting the representation of the user device 110 from the list. For example, the user 101 can click on a picture of the user device 110 on the user interface. The user 101 can tap a username or identifier of the user device 110 on the user interface. The user 101 can state a verbal identification of the user device 110 to select the device. Any other suitable manner of selecting the user device 110 from the list can be employed.

In block 320, the digital wallet account 121 deactivates the user device 110. When deactivation is initiated, the digital wallet account 121 user interface being utilized transmits the deactivation request to the payment processing system 140 and the user device 110 that is being deactivated. The payment processing system 140 can receive the request and deactivate the user device 110. The payment processing system 140 will no longer honor requests for transactions from the digital wallet application module 111 operating on the user device.

In an example, a transaction is attempted with the digital wallet application module 111 of a user device 110 that has been deactivated on the payment processing system 140. The payment processing system 140 can receive a transaction request and recognize that the user device 110 being used in the transaction has been deactivated by the user 101. The payment processing system 140 can recognize an identity of the user device 110 or other identifier included in the transaction details. When the payment processing system 140 recognizes an identity of a deactivated user device 110, the payment processing system 140 can refuse the transaction. The payment processing system 140 can additionally alert the user 101, the digital wallet account 121, or other party of the attempted transaction for the purposes of fraud prevention.

The digital wallet account 121 user interface being utilized to deactivate a user device 110 transmits the deactivation request to the user device 110 that is being deactivated. If the user device 110 is successfully contacted, then the user device 110 is deactivated and the digital wallet application module 111 can no longer be utilized for transactions using the digital wallet account 121 of the user 101.

In block 325, the digital wallet application module 111 is removed from the user device 110 that has been deactivated. Upon receiving the deactivation request from the digital wallet account 121, the digital wallet application module 111 can disable the account of the user on the digital wallet application module 111 by executing the instructions provided by the digital wallet account 121. Additionally or alternatively, the digital wallet application module 111 can be removed from a user device 110 that has been deactivated from the digital wallet account 121 by executing the instructions provided by the digital wallet account 121. In an example embodiment, the digital wallet account 121 can transmit instructions to the user device 110 to delete the digital wallet application module 111, to delete the digital wallet account information, to delete financial account information from the user device 110, or to delete any other suitable information that can be used to make the digital wallet application module 111 operable with the digital wallet account 121 of the user. Upon receipt, the digital wallet application module 111 can execute the instructions. Additionally or alternatively, the user 101 can manually delete the digital wallet application module 111 or other information from the user device 110.

If the digital wallet account 121 is unable to contact the user device 110 at the time of deactivation, then the deactivation can occur when the user device 110 next achieves network access. That is, when the user device 110 is again turned on, returned to a service area, or otherwise achieves a network connection, the instructions can be transmitted at that time.

In certain instances, the user device 110 may be partially disabled. A partially disabled state can be created when the payment processing system 140 can be updated, but not the user device 110. When the digital wallet account 121 is unable to contact the user device 110, the digital wallet application module 111 on the user device cannot be deleted or disabled. Moreover, if the user 101 has a stored value card on a user device 110 that is partially disabled, then the user 101 may still b vulnerable to charges on the stored value card, and the user 101 will need to contact the issuer of the stored value card to disable the card. The user interface will display to the user 101 that the digital wallet account 121 will retry the deactivation button until a complete deactivation is achieved or the digital wallet account 121 is requested to discontinue the deactivation.

In block 330, the user interface shows the status of the deactivation of the user device 110. The user interface will provide a clear indication to the user of what is happening, and what, if any, further action must be taken. The user interface displays to the user that the deactivation is successful, if the deactivation is in progress, if the user device 110 has been partially disabled, or any other suitable status.

The user interface will also allow the user 101 to remove any deactivated user devices 110 from the list of devices, or the removal can occur automatically. User devices 110 that have been deactivated can appear in the list in a disabled state until the user 101 manually deletes them. Additionally or alternatively, the user 101 can leave the deactivated devices on the list of devices or store the deactivated user device 110 in a list of deactivated or unused devices.

Additionally or alternatively, the deactivated user device 110 can remain on the list of devices but remain hidden from view until the user 101 requests that hidden devices be displayed. In an example embodiment, user devices 110 that are marked hidden will not be shown, except when showing a historic device view is requested.

If a user device 110 has been deactivated on the digital wallet account 121 at the payment processing system 140 but not the digital wallet application module 111 on the user device 110 has not been deactivated, a transaction can be attempted by a person in possession of the user device 110. For example, if a user device 110 is stolen, the person with the stolen user device 110 may attempt a transaction. The payment processing system 140 is notified of the transaction request. However, the payment processing system 140 determines that the user 101 requested to have the user device 110 deactivated on the user device list. The payment processing system 140 declines the transaction and attempts again to deactivate the digital wallet application module 111 on the user device.

Example Systems

Figure 4:
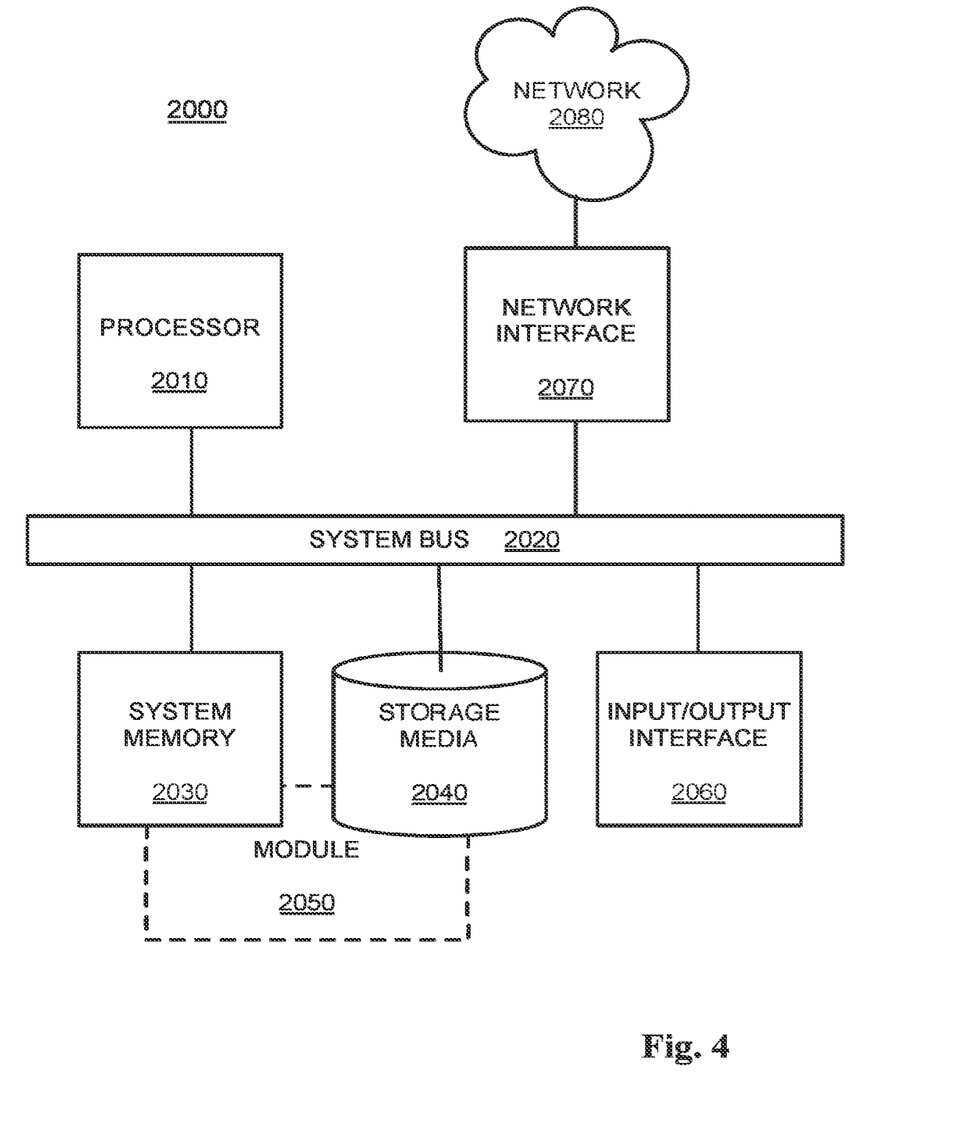
FIG. 4 is a block flow diagram depicting a computing machine and a module, in accordance with certain example embodiments.

FIG. 4 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCP"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, biometric readers, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with a opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the inventions claimed herein.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A computer-implemented method to deactivate user computing devices associated with user accounts, comprising:

presenting, using one or more computing devices, one or more mobile computing devices associated with an account of a user in a list of associated mobile computing devices;

receiving, using the one or more computing devices, a request to deactivate a particular mobile computing device from the list of associated mobile computing devices;

logging, using the one or more computing devices, the particular mobile computing device as deactivated, the logging of the particular mobile computing device as deactivated preventing the particular mobile computing device from conducting application requests utilizing the account by rejecting a request comprising an identification of the particular mobile computing device;

receiving, using the one or more computing devices and from the particular mobile computing device, an application request associated with the particular mobile computing device; and in response to receiving the application request from the particular mobile computing device and based on the logging of the particular mobile computing device as deactivated, instructing, using the one or more computing devices, the particular mobile computing device to delete an application associated with the account on the particular mobile computing device.

2. The computer-implemented method of claim 1, further comprising:
associating, using one or more computing devices, the one or more mobile computing devices with the account of the user, each of the associated one or more mobile computing devices being activated to conduct application requests.

3. The computer-implemented method of claim 1, further comprising:
displaying, using the one or more computing devices, a deactivated status of the particular mobile computing device in response to receiving the request to deactivate the particular mobile computing device from the list of associated mobile computing devices.

4. The computer-implemented method of claim 1, further comprising:
determining, using the one or more computing devices in response to receiving the application request from the particular mobile computing device, that the particular mobile computing device is deactivated.

5. The computer-implemented method of claim 1, wherein the list of associated mobile computing devices is presented via a user interface of an application executing on a mobile computing device.

6. The computer-implemented method of claim 1, wherein the deactivated mobile computing device is removed from the list of associated mobile computing devices.

7. The computer-implemented method of claim 1, wherein the particular mobile computing device comprises a magnetic stripe card, an RFID device, a smartcard, or an account identifier capable of being scanned.

8. A non-transitory computer-readable storage device having computer-readable program instructions embodied thereon that when executed by a computer device cause the computer device to:
present one or more mobile computing devices associated with an account of a user in a list of associated mobile computing devices;
receive a request to deactivate a particular mobile computing device from the list of associated mobile computing devices;
log the particular mobile computing device as deactivated, the logging of the particular mobile computing device as deactivated preventing the particular mobile computing device from conducting application requests utilizing the account by rejecting a request comprising an identification of the particular mobile computing device;
receive, from the particular mobile computing device, an application request associated with the particular mobile computing device; and
instruct, in response to receiving the application request from the particular mobile computing device and based on the logging of the particular mobile computing device as deactivated, the particular mobile computing device to delete an application associated with the account on the particular mobile computing device.

9. The non-transitory computer-readable storage device of claim 8, wherein the computer device further is to:
associate the one or more mobile computing devices with the account of the user, each of the associated one or more mobile computing devices being activated to conduct application requests utilizing the account.

10. The non-transitory computer-readable storage device of claim 8, wherein the computer device further is to:
display a deactivated status of the particular mobile computing device in response to receiving the request to deactivate the particular mobile computing device from the list of associated mobile computing devices.

11. The non-transitory computer-readable storage device of claim 8, wherein the computer device further is to:
determine, in response to receiving the application request from the particular mobile computing device, that the particular mobile computing device is deactivated.

12. The non-transitory computer-readable storage device of claim 8, wherein the list of associated user computing devices is presented via a user interface of an application on a user computing device.

13. The non-transitory computer-readable storage device of claim 8, wherein the particular mobile computing device comprises a mobile computing device, a magnetic stripe card, an RFID device, a smartcard, or an account identifier capable of being scanned.

14. A system to deactivate user computing devices associated with user accounts, comprising:
a storage device; and
a processor communicatively coupled to the storage device, wherein the processor is configured to execute application code instructions from the storage device that cause the system to:
present one or more mobile computing devices associated with an account of a user in a list of associated mobile computing devices;
receive a request to deactivate a particular mobile computing device from the list of associated mobile computing devices;
log the particular mobile computing device as deactivated, the logging of the particular mobile computer device as deactivated preventing the particular mobile computing device from conducting application requests utilizing the account by rejecting a request comprising an identification of the particular mobile computing device;
receive, from the particular mobile computing device, an application request associated with the particular mobile computing device; and
instruct, in response to receiving the application request from the particular mobile computing device and based on the logging of the particular mobile computing device as deactivated, the particular mobile computing device to delete an application associated with the account on the particular mobile computing device.

15. The system of claim 14, wherein the system further is to:
execute application code instructions stored in the storage device to cause the system to display a deactivated status of the particular mobile computing device in response to receiving the request to deactivate the particular mobile computing device from the list of associated mobile computing devices.

16. The system of claim 14, wherein the system further is to:
associate the one or more mobile computing devices with the account of the user, each of the associated one or more mobile computing devices being activated to conduct application requests utilizing the account.

17. The system of claim 14, wherein the system further is to:
determine, in response to receiving the application request from the particular mobile computing device, that the particular mobile computing device is deactivated.

18. The system of claim 14, wherein the particular mobile computing device comprises a mobile computing device, a magnetic stripe card, an RFID device, a smartcard, or an account identifier capable of being scanned.

19. The system of claim 14, wherein the list of associated mobile computing devices is presented via a user interface of an application executing on a mobile computing device.

20. The system of claim 14, wherein the deactivated mobile computing device is removed from the list of associated mobile computing devices.

* * * * *